United States Patent [19]

Blum

[11] Patent Number: 4,541,121
[45] Date of Patent: Sep. 10, 1985

[54] CHANGEOVER DEVICE FOR SELECTING ONE MODULATOR OUT OF TWO AND CONNECTING IT INTO A TRANSMITTER

[75] Inventor: Guy Blum, Montmagny, France

[73] Assignee: Thomson-CSF, Paris, France

[21] Appl. No.: 559,350

[22] Filed: Dec. 8, 1983

[30] Foreign Application Priority Data

Dec. 10, 1982 [FR] France .................... 82 20765

[51] Int. Cl.$^3$ .............................................. H04B 1/04
[52] U.S. Cl. .................................. 455/103; 455/115; 358/186
[58] Field of Search .................. 455/103, 105, 115, 8, 455/9; 358/186

[56] References Cited

U.S. PATENT DOCUMENTS

| | | | |
|---|---|---|---|
| 2,840,696 | 6/1958 | Beck et al. | 455/105 |
| 3,085,245 | 4/1963 | Wilson et al. | 455/103 |
| 3,363,181 | 1/1968 | Haywood et al. | 455/103 |

OTHER PUBLICATIONS

N.E.C., Research and Development, No. 63, Oct. 1981, pp. 83–91, Tokyo, Japan.
Telecommunications & Radio Engineering, vol. 30/31, No. 8, Aug. 1976, pp. 17–21, Washington, U.S.
Fernmelde-Praxis, vol. 50, No. 16, Aug. 25, 1973, pp. 689–712, Berlin, DE.

*Primary Examiner*—Jin F. Ng
*Attorney, Agent, or Firm*—Oblon, Fisher, Spivak, McClelland & Maier

[57] ABSTRACT

The changeover device is intended to produce either independent operation of a transmitter with its own modulator or coupled operation with another transmitter, in which case the two transmitters employ the same modulator, this modulator being associated with either of the two transmitters. The device comprises logical means for receiving any fault signals from the modulators as soon as they are produced and the control signals for indicating the modulator which it is desired to connect and for ensuring that, in the event of a fault occurrence in one out of two modulators, the other modulator is always selected irrespective of the control signals.

2 Claims, 2 Drawing Figures

CHANGEOVER DEVICE FOR SELECTING ONE MODULATOR OUT OF TWO AND CONNECTING IT INTO A TRANSMITTER

BACKGROUND OF THE INVENTION

This invention relates to a changeover device which makes it possible to select one modulator out of two in order to use it in a transmitter.

The choice of the modulator to be employed in a transmitter arises when, for reasons of transmission power and operational safety, two transmitters are coupled in order to transmit one or a number of signals but can also be dissociated in order to transmit independently. In fact, in this type of operation, each of the two transmitters has its own modulator whereas only one modulator is employed in a pair of coupled transmitters. Operational safety requirements, however, make it necessary in the event of failure of one of the two modulators to connect the other modulator automatically into both transmitters.

A known practice consists in making use of a control circuit (also designated as an automatic coupling circuit) in order to perform all the control functions relating to the operation of two associated transmitters. In order to take into account the fact that a failure of one of the transmitters or one of the modulators may be only transient, a control circuit of this type connects a modulator into a transmitter only after a time-delay which may be of the order of several seconds. Under these conditions, if a fault occurs in one modulator, there is a potential danger of a transmission accident which may even give rise to other failures and therefore prevent any resumption of normal transmission when the faulty modulator is replaced by the other modulator after the time-delay. This problem is encountered in particular in television when two "sound" transmitters are coupled.

SUMMARY OF THE INVENTION

The aim of the present invention is to carry out at electronic speed, that is to say without any time-delay, both turn-off and turn-on of the modulators of two transmitters designed for coupled operation This aim is achieved by means of a changeover device which is associated with each transmitter and which, in order to decide on the connections to be established, directly receives signals relating to any faulty operation of the modulators and immediately takes these fault signals into account in order to permit selection of the modulator to be connected According to the present invention, there is provided a changeover device for selecting one modulator out of two and connecting said modulator into a first transmitter, one of the two modulators being the modulator associated with the first transmitter and the other modulator being the modulator associated with a second transmitter. Said device comprises accesses for directly receiving any fault signals from the two modulators and control signals, said control signals being representative of the modulator which it is desired to connect into the first transmitter. The device further comprises electronic means for producing changeover signals as a function of the signals received by the accesses, said changeover signals being intended to indicate the particular modulator out of the two which is to be connected into the first transmitter. The modulator thus indicated is the one which provides correct operation whenever fault signals show that only one of the two modulators is defective. An electronic switch is also provided for receiving the changeover signals and carrying out the connecting operation indicated by said changeover signals.

BRIEF DESCRIPTION OF THE DRAWINGS

Other features of the invention will be more apparent upon consideration of the following description and accompanying drawings, wherein.

Corresponding elements and signals which appear in both figures are designated by the same references.

DESCRIPTION OF THE PREFERRED EMBODIMENT

Figure 1:
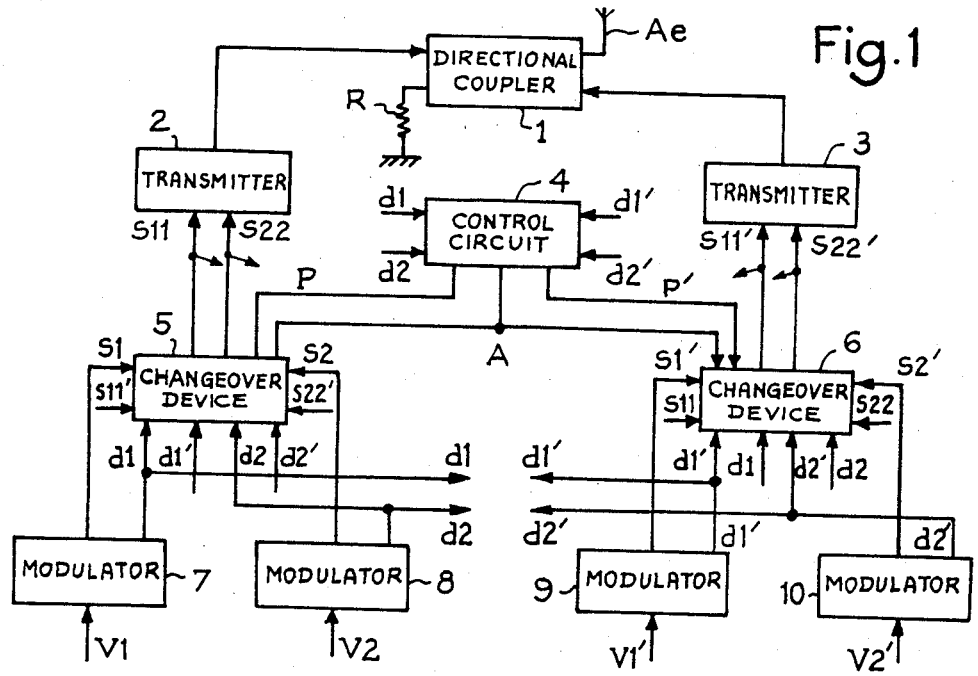
FIG. 1 illustrates a set of two transmitters coupled with two changeover devices in accordance with the invention.

FIG. 1 is a diagram of an assembly comprising two "sound" transmitters 2, 3 coupled together by means of a 3-dB directional coupler 1 which connects them to the same antenna Ae, a balancing load R being connected to the directional coupler 1

The transmitters 2 and 3 each have two specifically assigned frequency modulators respectively designated by the references 7, 8 and 9, 10 and relating to two "sound" channels, namely a first "sound" channel corresponding to the modulators 7 and 9 and a second "sound" channel corresponding to the modulators 8 and 10. The rectangles 2 and 3 of FIG. 1 are therefore transmitters without their modulators. This representation is due to the fact that, when they are in operation and are coupled by the coupler 1, only one of the modulators 7 and 9 is employed for the first "sound" channel of the two transmitters and only one of the modulators 8 and 10 is employed for the second "sound" channel of the two transmitters. In known designs, the choice of modulators to be employed is made by means of a control circuit which is also known as an automatic coupling circuit. In the known designs, this control circuit selects the modulators with a time-delay of several seconds in order to take into account the fact that a fault condition in a transmitter may be transient. There is nevertheless a momentary interruption of transmission. In the design according to the invention, a control circuit 4 is also employed. In the case of the example described, this control circuit 4 corresponds to the circuits of known designs but without the switches for connecting the modulators and without the electronic circuits for controlling these circuits. The control circuit 4 of FIG. 1 receives the different control signals given by an operator and the different fault signals in the event of fault conditions arising in the two transmitters 2 and 3 and in their modulators 7, 8, 9, 10. Among these signals, only the signals d1, d2, d1', d2' relating respectively to faults detected in the modulators 7, 8, 9 and 10 have been represented at least partially by their connections in FIG. 1.

The control circuits delivers three control signals:

a signal A which assumes the logical value 1 when the two transmitters are intended to operate independently without the coupler 1, for example at the time of operations which involve checking, maintenance or repair work on the transmitters; when the signal A assumes the logical value 0, a coupled operation of the two transmitters is desired;

a signal P which assumes the logical value 0 when, in a coupled operation, it is desired to employ the modulators 7 and 8, and which assures the logical value 1 when this is not the case;

a signal P' which assumes the logical value 0 when, in a coupled operation, it is desired to employ the modulators 9 and 10, and which assumes the logical value 1 when this is not the case; in fact the signal P' is equal to the inverse $\overline{P}$ of the signal P since it is assumed that, in coupled operation, the choice lies between either the modulators of the transmitter 2 or those of the transmitter 3.

The modulators 7 to 10 deliver in response to their input signals V1, V2, V1', V2' modulation signals S1, S2, S1', S2'. It is worthy of note in the case of the signals V1, V2, V1', V2' that, at the time of coupled operation of the two transmitters, V1 and V1' are identical and the same applies to V2 and V2'. In other words, the signals to be modulated are applied to the input of the modulators which are not connected in order that they may thus take the place of the other modulators without delay in the event of malfunctioning of these latter.

The connection between the modulators 7 to 10 and the transmitter 2 is effected through a changeover device 5 which delivers signals S11 and S22 to the transmitter 2. As will become apparent hereinafter, these signals correspond to signals which are selected (taking into account the modulations to be transmitted) from the output signals of those modulators 7 to 10 which operate correctly. Similarly, a changeover device 6 delivers to the transmitter 3 signals S11' and S22' which are selected from the output signals of the four modulators 7 to 10.

Figure 2:
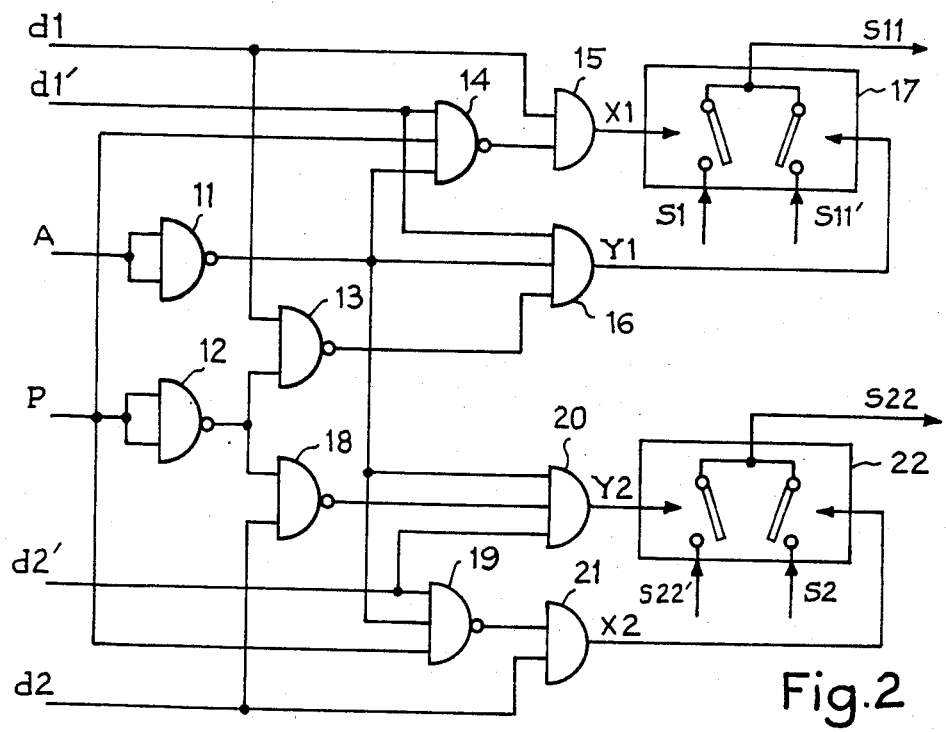
FIG. 2 is a detailed diagram showing one of the changeover devices of FIG. 1

The fault signals d1, d2, d1', d2' as well as the signal A and the signal P and the modulation signals S1, S2, S11', S22' are applied to the input of the changeover device 5, a detailed diagram of which is given in FIG. 2. It should be noted that any fault signals are sent directly from the modulators 7 to 10 to the changeover device 5, that is to say without the time-delays to which they are subjected within the control circuit 4.

As in known designs, any fault signals d1, d2, d1', d2' are obtained by means of threshold monitoring circuits which receive at their inputs a voltage from the automatic frequency control loop of the modulator and which deliver a fault signal when said voltage oversteps the limits which are predetermined by the thresholds of said monitoring circuits.

The changeover device 5 is so designed as to deliver two signals to the transmitter 2, namely a signal S11 which can be the signal S1 of the modulator 7 or the signal S11' of the changeover device 6 and a signal S22 which can be the signal S2 of the modulator 8 or the signal S22' of the changeover device 6.

FIG. 2 is a detailed diagram of the changeover device 5 of FIG. 1. This circuit arrangement has been developed from the results of formulation of equations relating to delivery of the modulated signals S1, S2, S11', S22' to the transmitter 2.

In Boolean algebra, these conditions can be written for permitting delivery of the signal S1:

$$x1 = d1.A + A.P.d1 + A.P.d1.\overline{d1'}$$

for forbidding delivery of the signal S1:

$$x'1 = \overline{d1}.A + \overline{d1}.A.P$$

for permitting delivery of the signal S11':

$$y1 = d1'.A.P + d1'.\overline{d1}.A.P$$

for forbidding delivery of the signal S11':

$$y'1 = A + A\overline{d1'}$$

The equation which gives permission x1 for delivery of the signal S1 means that sending of the output signal of the modulator 7 to the transmitter 2 will be authorized if the modulator 7 operates correctly (d1=1) and if the transmitters 2 and 3 are in independent operation (A=1)

or if the transmitters are in coupled operation ($\overline{A}=1$) and if the modulator 7 is selected ($\overline{P}=1$) and if the modulator 7 is operating correctly (d1=1)

or if the transmitters are in coupled operation and if the modulator 9 is selected ($\overline{P}=1$) but the modulator 7 is operating correctly (d1=1) whereas the modulator 9 is out of order ($\overline{d1'}=1$)

The explicit meaning of the equations which give x'1, y1, y'1 can readily be deduced from the foregoing statement with reference to x1 and will therefore not be given in this description.

The equations which give x1, x'1, y1, y'1 make it possible to write the control conditions for a first electronic switch 17 (type 4053B manufactured by RCA or Motorola) represented diagrammatically by a mechanical switch in FIG. 2. The switch 17 is employed for sending the signal S11 (that is to say either S1 or S11') to the transmitter 2:

for sending the signal S1 from the modulator 7 (that is to say from the local modulator with respect to the transmitter 2), the control is $X1 = x1.\overline{x'1}$, which gives after simplification $X1 = d1.\overline{A.P.d1'}$; this means that the switch 17 will be in the conducting state for the signal S1 if the modulator 7 is operating correctly, unless the transmitters are in coupled operation ($\overline{A}=1$) unless the modulator 9 is selected (P=1) and unless the modulator 9 is operating correctly (d1'=1);

for sending the signal S11' from the modulator 9 (that is to say from the "remote" modulator with respect to the transmitter 2), the control is $$Y1 = y1.\overline{y'1} = d1.A.\overline{P}.\ \overline{d1}$$

which means that the switch 17 will be in the conducting state for the signal S11' if the modulator 9 is operating correctly (d1'=1) and if the transmitters are in coupled operation ($\overline{A}=1$) unless the modulator 7 is selected ($\overline{P}=1$) and unless it is operating correctly (d1=1).

The control conditions for a second video switch which is identical with the first, for sending the signal S22 (that is to say either S2 or S22') to the transmitter 2, are deduced from the conditions given above by replacing the 1s (ones) by 2s (twos):

$$X2 = d2.\overline{A.P.d2'}$$

$$Y2 = d2'.A.\overline{P.d2}$$

FIG. 2 shows how the logic circuit can be constructed as a function of the conditions of control of the switches 17 and 22. This circuit has two NAND-gates 11, 12 mounted as inverters by coupling their two inputs, four NAND-gates, two of which have two inputs 13, 18 and two of which have three inputs 14, 19, and four AND-gates, two of which have two inputs 15, 21 and two of which have three inputs 16, 20.

The signal d1 is applied to the first input of the gates 13 and 15; the signal d1' is applied to the first input of the gates 14, 16; the signal A is applied to the input of the inverter 11; the signal P is applied to the second input of the gate 14, to the input of the inverter 12 and to the third input of the gate 19; the signal d2' is applied to the first input of the gate 19 and to the third input of the gate 20; the signal d2 is applied to the second input of the gates 18 and 21.

The output of the inverter 11 is connected to the third input of the gate 14, to the second input of the gates 16 and 19 and to the first input of the gate 20. The output of the inverter 12 is connected to the second input of the gate 13 and to the first input of the gate 18. The output of the gate 13 is connected to the third input of the gate 16. The output of the gate 14 is connected to the second input of the gate 15. The gate 15 delivers the signal X1 and the gate 16 delivers the signal Y1.

The output of the gate 18 is connected to the second input of the gate 20. The output of the gate 19 is connected to the first input of the gate 21. The gate 21 delivers the signal X2 and the gate 20 delivers the signal Y2.

The changeover device 6 associated with the transmitter 3 is identical with the changeover device 5 and the signals which arrive at or leave the two changeover devices are designated by the same references except for different prime indices: d1, d1', d2, d2', S1, S2, S11, S22, S11', S22' are replaced respectively by d1', d1, d2', d2, S1', S2', S11', S22', S11 and S22.

The invention is not limited to the example described in the foregoing. Thus in the event that the transmitters have only one "sound" channel and therefore only one "sound" modulator (for example the modulator 7 in the case of the transmitter 2), the changeover device in FIG. 2 is simplified by suppression of the elements 18 to 22. Similarly, the logic circuits for delivering signals such as X1 and Y1 can be constructed in a manner which differs from the arrangement shown in FIG. 2 since, in particular, the signal X1 can also be written $X1 = d1(\overline{A} + A.P + A.P.\overline{d1'})$ and the signal Y1 can be written $Y1 = d1'.A.(P + \overline{d1}.P)$.

Moreover, the device 5 is capable of operating with the signals S1' and S2' instead of the signals S11' and S22'. Similarly, the device 6 can operate with the signals S1 and S2 instead of the signals S11 and S22. In this mode of operation, there is no change to be made in the devices 5 and 6. In this case, however, when the modulator 9 located within the enclosure containing the transmitter assembly 3-6-9-10 develops a fault condition, the dubious signal S1' is passed into the enclosure containing the transmitter assembly 2-5-8-9 and may produce within this latter disturbances caused by coupling. By means of the signal S11', this drawback is avoided since S11' is constituted either by a correct signal S1 or S1' or by a zero signal if the modulators 7 and 9 are faulty.

What is claimed is:

1. A changeover device for selecting one modulator out of two and connecting the selected modulator into a first transmitter, one of the two modulators being the modulator associated with the first transmitter and the other modulator being the modulator associated with a second transmitter, said device comprising: means for directly receiving any fault signals from the two modulators and control signals, said control signals being representative of the modulator to be connected into the first transmitter; electronic means for producing changeover signals as a function of the signals received by the fault signals receiving means, said changeover signals indicating the particular modulator out of the two which is to be connected into the first transmitter, the modulator thus indicated being the one which is operating correctly whenever fault signals show that only one of the two modulators is defective, and an electronic switch for receiving the changeover signals and carrying out the connecting operation indicated by said changeover signals 2. A changeover device according to claim 1, wherein the electronic means producing changeover signals $X1 = \overline{d1}.A.P.d1'$ and $Y1 = d1'.\overline{A.P.d1}$, where X1 and Y1 are respectively the changeover signals relating to connection of each of the two modulators into the first transmitter, where d1 and d1' are the fault signals respectively from the two modulators, where A and P are the control signals and represent respectively an independent-operation control of the two transmitters and a control in which the other modulator is connected into the first transmitter.

* * * * *